United States Patent [19]

McConnell

[11] 4,101,233
[45] Jul. 18, 1978

[54] PANEL MOUNTING CLIP FOR STORAGE RACK

[75] Inventor: Kennedy McConnell, Homewood, Ill.

[73] Assignee: Interlake, Inc., Oak Brook, Ill.

[21] Appl. No.: 781,168

[22] Filed: Mar. 25, 1977

[51] Int. Cl.² ............................................. B25G 3/36
[52] U.S. Cl. ..................................... 403/397; 52/489; 108/159; 211/187
[58] Field of Search ...................... 403/397, 406, 408; 211/187; 108/107, 111, 159; 52/489

[56] References Cited

U.S. PATENT DOCUMENTS

| 516,291 | 3/1894 | Aylworth et al. .................. 403/397 |
| 2,343,494 | 3/1944 | Burdick ........................... 403/406 X |
| 2,459,953 | 1/1949 | Mills ............................... 403/408 X |
| 2,490,663 | 12/1949 | Van Uum et al. .................. 52/489 X |
| 3,711,137 | 1/1973 | Tinnerman ....................... 52/489 X |

Primary Examiner—Wayne L. Shedd
Attorney, Agent, or Firm—Vogel, Dithmar, Stotland, Stratman & Levy

[57] ABSTRACT

A mounting clip is adapted for attachment to a deck panel of a storage rack to facilitate assembly of the deck panel with apertured rack beams. The clip has a folded-over flange which cooperates with a cut-out tab to resiliently clamp therebetween an edge of an associated panel with the tab received in a complementary opening in the panel, the clip having a depending finger with a thin and narrow neck portion and an enlarged distal end portion dimensioned to permit insertion of the finger in an aperture of the associated beam but to inhibit accidental dislodgement of the finger from the aperture. An additional projection on the clip inhibits tangling and interlocking of the clips when stored in bulk and also serves to position the clip on an associated panel.

14 Claims, 12 Drawing Figures

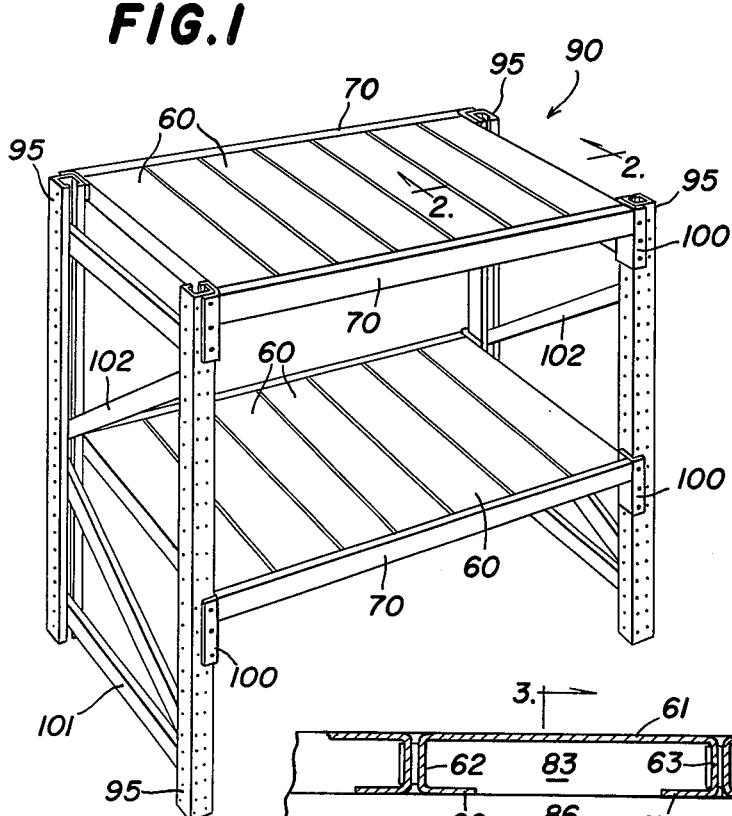
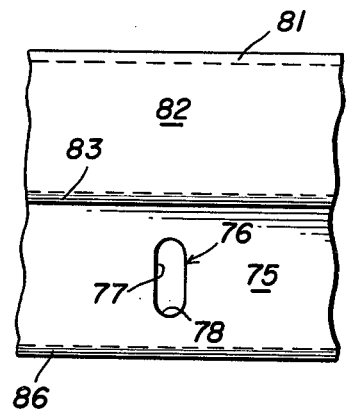
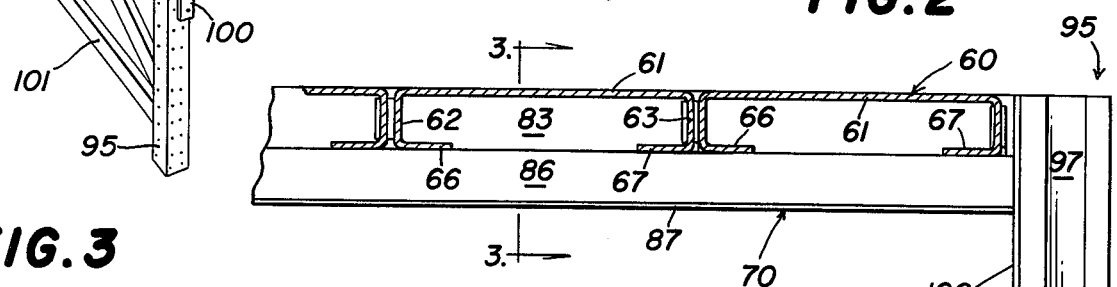
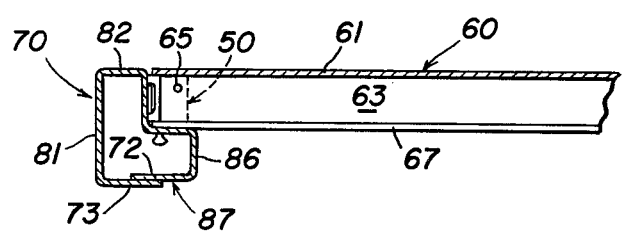
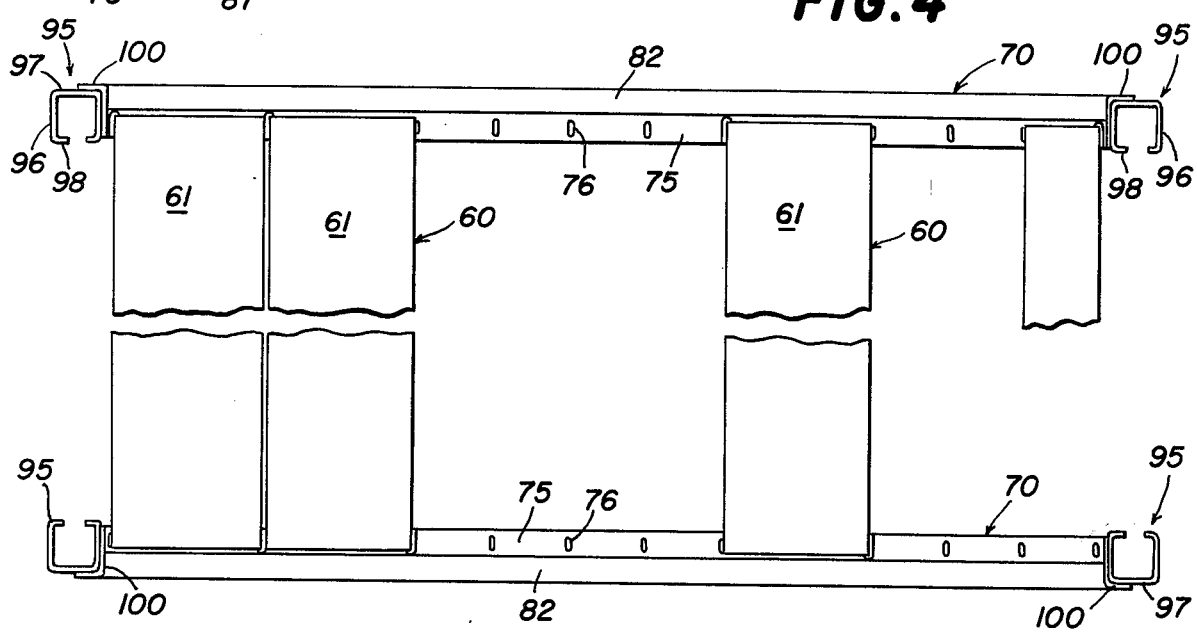

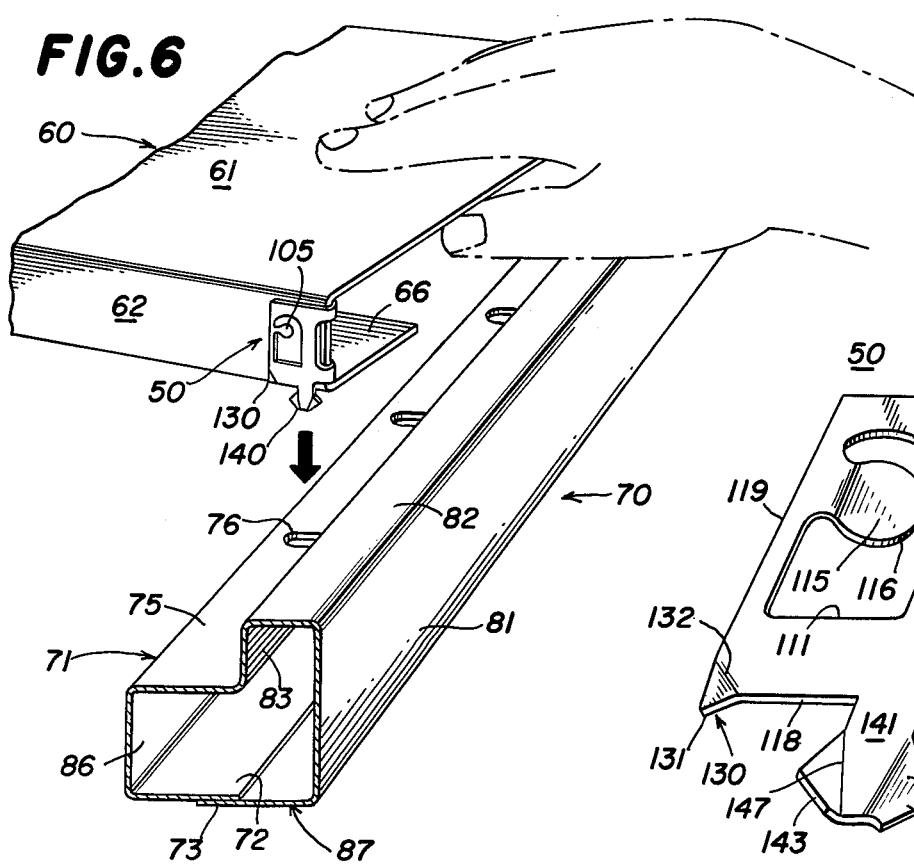
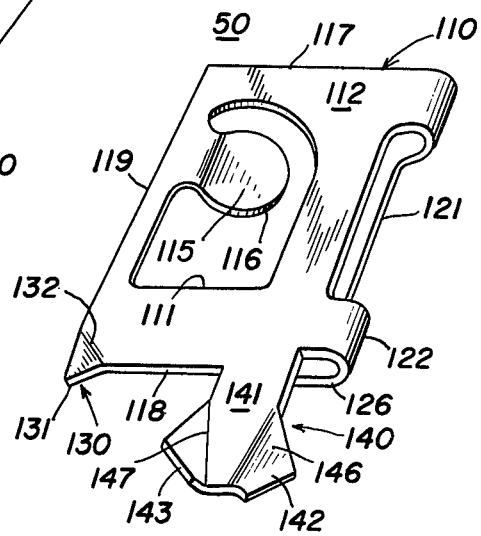
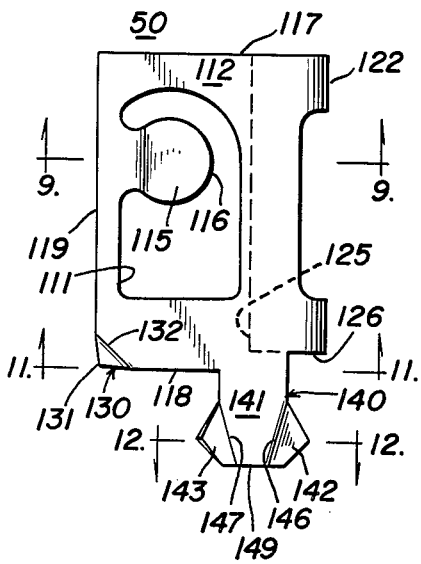
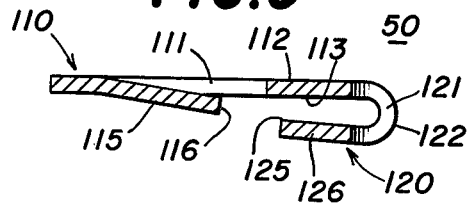
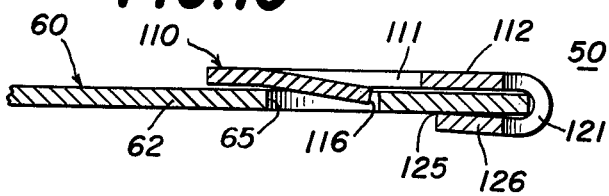
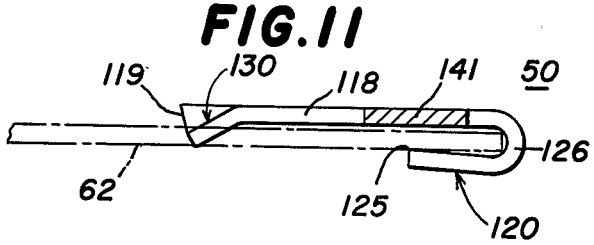
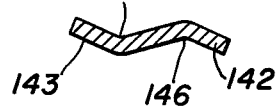

PANEL MOUNTING CLIP FOR STORAGE RACK

BACKGROUND OF THE INVENTION

The present invention relates to a mounting clip to facilitate mounting of deck plates, cross bars or the like on the apertured beams of a storage rack.

Storage racks of the general type with which the present invention is intended to be used are disclosed in U.S. Pat. No. 3,042,221, issued to G. E. Rasmussen on July 3, 1962, and assigned to the assignee of the present invention. The beams of such racks are provided with ledges which face each other in use and are substantially coplanar for receiving thereon the opposite ends of deck members, cross bars or other rack members or for directly receiving thereon the opposite edges of pallets. That type of prior art rack construction does not afford any means for accurately positioning the deck or cross bar members on the beams, or for preventing accidental dislodgement thereof from the beams in use. More particularly, the cross bars or deck members are frequently accidentally dislodged from the beam by the upward forces exerted by the fork members of forklift trucks used for loading and unloading material on the storage rack, this being a particular problem when there is no load upon the deck members or cross bars.

In order to alleviate this problem, special apertured beams have been provided for use with special types of cross bars having mounting fingers adapted to be inserted into the apertures for positioning the cross bars and retaining them against accidental dislodgement. This latter type of arrangement is disclosed in my copending application Ser. No. 781,172, filed Mar. 25, 1977, entitled "CROSS BAR", and assigned to the assignee of the present invention. But this construction requires the use of a specially designed cross bar, which cross bar is usable only with the apertured type of beams. Furthermore, deck members and cross bars provided with the older type of rack construction with non-apertured beams cannot be used with the apertured-beam rack of my aforementioned copending application. Thus, completely separate lines of cross bars and deck members for use with the two types of rack beams must be manufactured and maintained in inventory at considerable expense.

SUMMARY OF THE INVENTION

The present invention overcomes these limitations of the prior art by providing a mounting clip which can be attached to deck members or the like which are not provided with mounting fingers and thereby adapt such deck members for mounting on storage racks with apertured beams.

It is an important feature of the present invention to provide a mounting clip which is resiliently clamped on an edge of an associated deck panel and is provided with a resilient tab receivable in a complementary opening in the panel and a finger for insertion into the apertures of a rack beam.

It is another important feature of the present invention that the mounting clip is of simple and economical construction and capable of easily being attached without the use of any separate fastening means.

Another feature of this invention is that the finger of the mounting clip is so shaped and dimensioned as to permit ready insertion into the beam apertures for mounting the associated deck panel, but thereafter inhibiting accidental dislodgement of the clip finger from the aperture.

It is still another feature of this invention that the mounting clip is so shaped and dimensioned as to inhibit tangling and interlocking of the mounting clips with one another when stored in bulk.

The foregoing features are obtained, and it is an object of the present invention to obtain these advantages by providing a clip for securing a deck panel to an apertured beam in a storage rack to maintain the positional relationship of the panel and the beam during material loading and unloading, the clip comprising a body having first and second contact means, the first and second contact means cooperating securely to hold an associated panel therebetween in frictional engagement therewith for mounting the body on the associated panel, and a finger extending from the body and having engagement means for insertion through an aperture in an associated beam to engage the beam thereby to maintain the positional relationship of the panel and the beam during material loading and unloading.

Further features of the invention pertain to the particular arrangement of the parts of the mounting clip whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a perspective view of a storage rack with deck panels mounted thereon by use of the mounting clips of the present invention;

FIG. 2 is an enlarged fragmentary view in vertical section taken along the line 2—2 in FIG. 1;

FIG. 3 is a fragmentary view in vertical section taken along the line 3—3 in FIG. 2;

FIG. 4 is an enlarged fragmentary top plan view of the storage rack illustrated in FIG. 1;

FIG. 5 is a further enlarged fragmentary top plan view of a portion of one of the storage rack beams on which deck panels are mounted by use of the present invention;

FIG. 6 is a fragmentary perspective view of a portion of a rack beam and deck panel in disassembled condition, illustrating the method of mounting the deck panel by use of the mounting clip of the present invention;

FIG. 7 is an enlarged perspective view of a mounting clip constructed in accordance with and embodying the features of the present invention;

FIG. 8 is a reduced front elevational view of the mounting clip illustrated in FIG. 7;

FIG. 9 is a view in vertical section taken along the line 9—9 in FIG. 8;

FIG. 10 is a view similar to FIG. 9, with the mounting clip illustrated in its mounted configuration on an associated deck panel;

FIG. 11 is a view in vertical section taken along the line 11—11 in FIG. 8; and

FIG. 12 is a view in vertical section taken along the line 12—12 in FIG. 8.

DESCRIPTION OF THE PREFERRED EMBODIMENT

Referring now to FIGS. 1 and 7 of the drawings, there is illustrated a mounting clip, generally designated by the numeral 50, constructed in accordance with and embodying the features of the present invention. In use, two or more of the mounting clips 50 are attached to a deck panel 60 for mounting the deck panel 60 on spaced-apart beams 70 of a storage rack 90.

Each of the deck panels 60 is integrally formed of a single piece of sheet material, preferably metal, and includes an elongated flat rectangular platform 61 which is integral along the opposite side edges thereof respectively with two downwardly extending side walls 62 and 63, which are in turn respectively integral along the lower edges thereof with inwardly extending flanges 66 and 67. The flanges 66 and 67 are disposed substantially parallel to the platform 61 and coplanar with each other, whereby the deck panel 60 is substantially C-shaped in transverse cross section. Preferably, each of the side walls 62 and 63 is provided with a small circular opening 65 adjacent to each end thereof. The storage rack 90 includes a plurality of upstanding posts 95, each of which is a generally rectangular tubular member having four side walls 96, one of which is provided with a longitudinally extending slot 97 therein so that the post 95 is generally C-shaped in transverse cross section. Each of the other walls 96 of each post 95 is provided with a plurality of longitudinally spaced-apart holes 98 therein. The posts 95 are arranged at the corners of a rectangular configuration, with the slots 97 of the front ones of the posts 95 respectively facing the slots 97 of the rear ones of the posts 95, the front posts 95 being respectively connected to the rear posts 95 by upper and lower horizontal brace members 101 and diagonal brace members 102, the opposite ends of each of the brace members 101 and 102 being respectively received in the slots 97 of the posts 95 and fixedly secured thereto by suitable means.

The front posts 95 are interconnected by elongated horizontally extending and vertically spaced-apart beams 70, the rear posts 95 also being interconnected in like manner by additional beams 70. Referring also to FIGS. 2 through 6 of the drawings, each of the beams 70 is a hollow tubular member and is preferably formed integrally of a single piece of metal, the opposite side edges 72 and 73 of which are overlapped and fixedly secured together as by welding to close the tubular configuration and form a bottom wall 87 thereof, which is disposed substantially horizontally in use. The bottom wall 87 is integral respectively along the rear and front edges thereof with parallel upstanding outer and inner side walls 81 and 86, the outer side wall 81 having a vertical extent substantially greater than that of the inner side wall 86. Integral with the outer side wall 81 along the upper edge thereof is a top wall 82 which extends forwardly parallel to the bottom wall 87, but only partway toward the front edge thereof. Integral with the inner side wall 86 at the upper end thereof and extending rearwardly therefrom substantially parallel to the bottom wall 87 is a ledge 75 which terminates in an upstanding shoulder wall 83 which is disposed parallel to the side walls 81 and 86 and interconnects the adjacent ends of the top wall 82 and the ledge 75.

It will be appreciated that the ledge 75 and shoulder wall 83 cooperate to define a shelf in the beam 70. Formed in the ledge 75 is a plurality of longitudinally spaced-apart apertures 76, each of the apertures 76 being generally oval in shape and having elongated side edges 77 which extend transversely of the ledge 75 and are interconnected by arcuate end edges 78. Respectively fixedly secured to the opposite ends of the beam 70, as by welding, are two mounting brackets 100 which are preferably provided with pins or lugs (not shown) adapted to be received in the holes 98 of the posts 95, all as is more fully described in the aforementioned U.S. Pat. No. 3,042,221.

In use, the beams 70 are mounted on the posts 95 so that the ledges 75 face inwardly of the rack 90, with the beams 70 being arranged in pairs having the ledges 75 thereof disposed in a common horizontal plane. Each such pair of ledges 75 is adapted to be spanned by a plurality of cross bars or deck panels 60. In use, the deck panels 60 are arranged with the platforms 61 thereof disposed upwardly and substantially horizontally, a sufficient number of the deck panels 60 being used so as to form a substantially continuous deck for mounting merchandise thereon. The deck panels 60 are positioned so as to span a pair of the beams 70, with the opposite ends of the deck panels 60 being respectively supported on the ledges 75. Preferably, the height of the deck panel side walls 62 and 63 is such that, when mounted on the beam ledges 75, the upper loadbearing surfaces of the platforms 61 are substantially coplanar with the upper surfaces of the top walls 82 of the beams 70.

Referring now also to FIGS. 8 through 12 of the drawings, the mounting clip 50 is integrally formed of a single piece of metal, such as spring steel, and includes a substantially flat rectangular body, generally designated by the numeral 110, having a flat planar outer surface 112 and a flat planar inner surface 113. A large irregular portion of the body 110 is cut out as at 111 to form a tab 115 which is part-circular in shape and is bent out of the plane of the body 110 at a slight angle thereto so as to project inwardly of the inner surface 113. The rectangular body 110 is defined by parallel top and bottom edges 117 and 118 and a side edge 119. The side of the body 110 opposite the edge 119 defines a flange, generally designated by the numeral 120, which is recurved or folded back over the rear surface 113 of the body 110 in overlapping relationship therewith so that the inner distal edge 125 of the flange 120 is disposed parallel to the body inner surface 113 and spaced a predetermined distance therefrom and from the tab 115. A rectangular portion of the body 110 is cut out as at 121 in the vicinity of the fold in the flange 120 to leave hinge-like upper and lower fold or bight portions 122 interconnecting the flange 120 with the body 110. A corner 130 of the body 110 at the intersection of the edges 118 and 119 is bent inwardly along a bend line 132 in the same direction as the tab 115 to form a triangular tip 131.

Integral with the body 110 and extending downwardly from the lower edge 118 thereof generally in the region between the cutouts 111 and 121 is a finger, generally designated by the numeral 140, which includes a flat neck portion 141 having inner and outer surfaces substantially coplanar respectively with the inner and outer surfaces 113 and 112 of the body 110. Respectively extending rearwardly and forwardly from the neck portion 141 at the distal end thereof are two generally triangular projections 142 and 143, which are respectively bent inwardly and outwardly of the plane of the neck portion 141 along bend lines 146 and 147 and form an engagement portion of the finger 140.

Referring to FIGS. 6, 10 and 11, in use the mounting clip 50 is attached to an end edge of one of the side walls 62 or 63 of a deck panel 60. For purposes of illustration, the mounting clip 50 has been shown mounted on the side wall 62 of a deck panel 60 in FIG. 6. The mounting clip 50 is disposed with the upper and lower edges 117 and 118 thereof respectively disposed adjacent and parallel to the upper and lower edges of the panel side wall 62, and with the inner surface 113 of the mounting clip body 110 disposed along the outer surface of the panel side wall 62 so that the edge of the panel side wall 62 is received between the mounting clip body 110 and flange 120. It will be noted that the distance between the distal end of the flange 120 and the inner surface 113 of the body 110 is slightly greater than the thickness of the panel side wall 62 for receiving it therebetween, the mounting clip 50 being pushed to a mounting position wherein the edge of the panel side wall 62 abuts against the bight portions 122 of the flange 120 and the tab 115 is snapped into the opening 65 (see FIG. 10) securely to lock the mounting clip 50 in place.

But the distance between the distal edge of the flange 120 and the distal edge of the tab 115, as measured perpendicularly to the body 110, is less than the thickness of the deck panel side wall 62. Since the mounting clip 50 is formed of a resilient material, the tab 115 can be deflected slightly by the deck panel side wall 62 to wedge it past the tab 115 and thence between the body 110 and flange 120. Thus, it will be appreciated that even if the panel 60 is not provided with the openings 65, the tab 115 and the flange 120 form contact means which respectively firmly engage the outer and inner surfaces of the deck panel side wall 62 for securely holding the mounting clip 50 in place. It will also be noted that the bottom edge 126 of the flange 120 is disposed a predetermined distance above the bottom edge 118 of the body 110, which distance is preferably at least the thickness of the flanges 66 and 67 of the deck panel 60. The total height of the flange 120 is preferably slightly less than the height of the deck panel side wall 62 so that it will fit easily between the platform 61 and flange 66 of the deck panel 60. When thus mounted in place, the bent tip 131 of the body 110 will engage the bottom edge of the deck panel side wall 62 to assist in positioning the mounting clip 50 thereon.

The mounting clip 50 is mounted on the deck panel 60 with the finger 140 extending downwardly. It will be noted that the maximum front-to-back width of the finger 140 at the projections 142 and 143 is substantially greater than the width of the neck portion 141, this maximum front-to-back width preferably being very slightly less than the length of one of the apertures 76 in the beam ledges 75. Furthermore, the maximum thickness of the finger 140 from the innermost point of the projection 142 to the outermost point of the projection 143 is slightly less than the width of one of the apertures 76. Thus, when the mounting clip 50 is attached to the deck panel 60 in the manner described above, the finger 140 may be inserted in a selected one of the apertures 76 by moving the deck panel 60 in the direction of the arrow in FIG. 6, as long as the finger 140 is centered directly over the aperture 76 in alignment therewith.

Normally, in order securely to position a deck panel 60 in place on the beam 70, it will be necessary only to use two of the mounting clips 50, respectively attached at diagonally opposite corners of the deck panel 60. Because the neck portion 141 of the finger 140 is substantially thinner and narrower than is the distal end of the finger 140 in the region of the projections 142 and 143, once the fingers 140 have been inserted into the apertures 76, a certain amount of play of the fingers 140 in the apertures 76 will be permitted as material is loaded and unloaded from the deck panels 60. But because of the very close fit of the projections 142 and 143 in the aperture 76, the slightest bit of such play will move the fingers 140 out of alignment with the aperture 76, thereby preventing removal of the fingers 140 from the aperture 76 by upwardly directed forces on the deck panel 60. Therefore, in normal use, accidental dislodgement of the deck panel 60 will be substantially inhibited, except in the rare cases when the fingers 140 just happen to be precisely centered with respect to the aperture 76 at the moment the dislodging force is applied. Furthermore, even in that rare instance, the dislodging force must be a purely vertically upwardly directed force with no horizontal components, since any such horizontal component force would move the fingers 140 off-center with respect to the aperture 76.

The bent tip 131 of the mounting clip 50 also serves an additional function. Normally, the mounting clips 50 are handled in bulk during certain processing steps in the manufacture thereof such as plating and the like, and they are also stored and shipped in bulk to the users. Because of the irregular configuration of the mounting clip 50 with both projections and cutout portions, there is a tendency for the clips to become tangled and interlocked with one another when stored in bulk. This presents a significant inconvenience, and users will tend to discard locked-together pieces, resulting in a significant amount of waste. It has been found that the bent tip 131, the displacement of which from the plane of the body 110 is at least as great as the displacement of the tab 115, serves to inhibit the movement of mounting clips 50 in bulk into interlocking engagement with one another, thereby significantly reducing the amount of waste resulting from the interlocking phenomenon.

While the mounting clip 50 is preferably formed of spring steel, it will be appreciated that it could be formed of other metals or any other material having a suitable strength and resilience for the intended functions.

It will be noted that a significant advantage of the mounting clip 50 is that it can be attached to the deck panel 60 without the use of any fasteners. Normally, it will be possible to manually force fit the mounting clip 50 onto the edge of the deck panel side wall without the use of any tools, but at most the only tool necessary would be a small hammer or mallet.

From the foregoing, it can be seen that there has been provided an improved mounting clip for use with deck panels and the like in storage racks to facilitate mounting of the deck panels on apertured beams of the storage rack.

More particularly, there has been provided a mounting clip of the character described, which includes a finger projecting therefrom, shaped and dimensioned to be received in an aperture of the rack beams, but to inhibit accidental removal thereof from the aperture.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A clip for securing a deck panel having openings therein adjacent to the ends thereof to an apertured beam in a storage rack to maintain the positional relationship of the panel and the beam during material loading and unloading, said clip comprising a generally flat body, a recurved flange carried by said body adjacent to the periphery thereof and extending therefrom in a first direction in overlapping spaced-apart relationship with a portion of said body, a tab extending from said body toward said flange and spaced therefrom in a direction perpendicular to said body a distance less than the thickness of an associated panel, said tab being deflectable away from said flange for cooperation therewith securely to hold the associated panel therebetween for mounting said body on the associated panel, and a finger extending from said body beyond the periphery thereof in a second direction substantially normal to said first direction, and having engagement means for insertion through an aperture in an associated beam to engage the beam thereby to maintain the positional relationship of the panel and the beam during material loading and unloading.

2. The clip of claim 1, wherein said flange and said tab and said finger are unitary with said body.

3. The clip of claim 1, wherein said tab extends unitarily from said body.

4. The clip of claim 1, wherein said flange is generally rectangular in shape and said tab is substantially part-circular in shape.

5. The clip of claim 1, wherein said flange is connected to said body by a bight portion engageable in use with an edge of the associated panel for retaining said clip along the panel edge.

6. The clip of claim 1, wherein said tab is adapted for engagement in one of the openings in the associated panel securely to lock said clip in place on the panel.

7. A clip for securing a deck panel to an apertured beam in a storage rack to maintain the positional relationship of the panel and the beam during material loading and unloading, said clip comprising a substantially flat body having first and second contact means, said first contact means extending in a first direction toward said second contact means and cooperating therewith securely to hold an associated panel therebetween for mounting said body on the associated panel, and a finger extending from said body beyond the periphery thereof in a second direction substantially normal to said first direction, and having a relatively thin and narrow flat planar neck portion adjacent to said body and an engagement portion at the distal end of said finger, said engagement portion having an overall width and thickness respectively greater than the width and thickness of the neck portion, said engagement portion being receivable through an aperture in an associated beam only when disposed in alignment therewith, whereby movement of said engagement portion out of alignment with the aperture after insertion therethrough inhibits accidental withdrawal of said finger from the aperture thereby to maintain the positional relationship of the panel and beam during material loading and unloading.

8. The clip of claim 7, wherein said body is generally flat and substantially coplanar with said neck portion of said finger.

9. The clip of claim 7, wherein said engagement portion comprises two projections integral with said neck portion and respectively extending in opposite directions laterally thereof and out of the plane thereof.

10. The clip of claim 9, wherein each of said projections is generally triangular in shape.

11. The clip of claim 10, wherein said body is substantially rectangular in shape, said third contact means comprising an inwardly bent corner of said body.

12. The clip of claim 10 wherein each of said first and second and third contact means and said finger is unitary with said body.

13. The clip of claim 10 wherein said first and second contact means extend from the plane of said body, said body having an irregular opening therethrough defining said second contact means, said third contact means extending from the plane of said body at least as far and in the same direction as said second contact means.

14. A clip for securing a deck panel to an apertured beam in a storage rack to maintain the positional relationship of the panel and the beam during material loading and unloading, said clip comprising a substantially flat body having first and second contact means extending therefrom, said first contact means extending in a first direction toward said second contact means and cooperating therewith securely to hold an associated panel therebetween with said first contact means being engageable with a first edge of the associated panel for mounting said body on the associated panel, third contact means extending from said body for engagement with a second edge of the associated panel to position said body with respect to the associated panel, and a finger extending from said body beyond the periphery thereof in a second direction substantially normal to said first direction, and having engagement means for insertion through an aperture in an associated beam to engage the beam thereby to maintain the positional relationship of the panel and the beam during material loading and unloading.

* * * * *